(12) United States Patent
Wilson et al.

(10) Patent No.: US 6,961,431 B2
(45) Date of Patent: Nov. 1, 2005

(54) ANALOG PRIVACY SCRAMBLER AND SCRAMBLING METHOD

(75) Inventors: Dennis L. Wilson, Palo Alto, CA (US); Julius Lange, Cupertino, CA (US); Andrew Brown, Mountain View, CA (US)

(73) Assignee: Lockheed Martin Corp., Bethesda, MD (US)

( * ) Notice: Subject to any disclaimer, the term of this patent is extended or adjusted under 35 U.S.C. 154(b) by 1033 days.

(21) Appl. No.: 09/795,799

(22) Filed: Feb. 28, 2001

(65) Prior Publication Data

US 2002/0118834 A1    Aug. 29, 2002

(51) Int. Cl.$^7$ ............................................. H04L 9/00

(52) U.S. Cl. .................. 380/275; 380/253; 380/266

(58) Field of Search ............................. 380/253, 275, 380/276, 266

(56) References Cited

U.S. PATENT DOCUMENTS

| | | | |
|---|---|---|---|
| 4,516,079 A * | 5/1985 | York | 329/306 |
| 5,218,619 A * | 6/1993 | Dent | 370/209 |
| 5,742,679 A * | 4/1998 | Olafsson | 370/527 |
| 6,175,551 B1 * | 1/2001 | Awater et al. | 370/210 |

* cited by examiner

*Primary Examiner*—Gilberto Barrón, Jr.
*Assistant Examiner*—Lan Dai Thi Truong
(74) *Attorney, Agent, or Firm*—Kenneth W. Float

(57) ABSTRACT

A system and method for maintaining privacy in transmission of a high bandwidth analog signal. A preferred system and method breaks an input signal into bands and then uses Walsh codes to overlay many signals on top of each other with a set of phase modulators to establish scrambling of the input signal. The scrambled signal is then transmitted. The received scrambled signal has the phase modulation removed and an inverse Walsh transform recovers the original bands. The recovered bands are added together to recover the original signal. The system and method use techniques that establish synchronization and phase coherency complete the process.

12 Claims, 3 Drawing Sheets

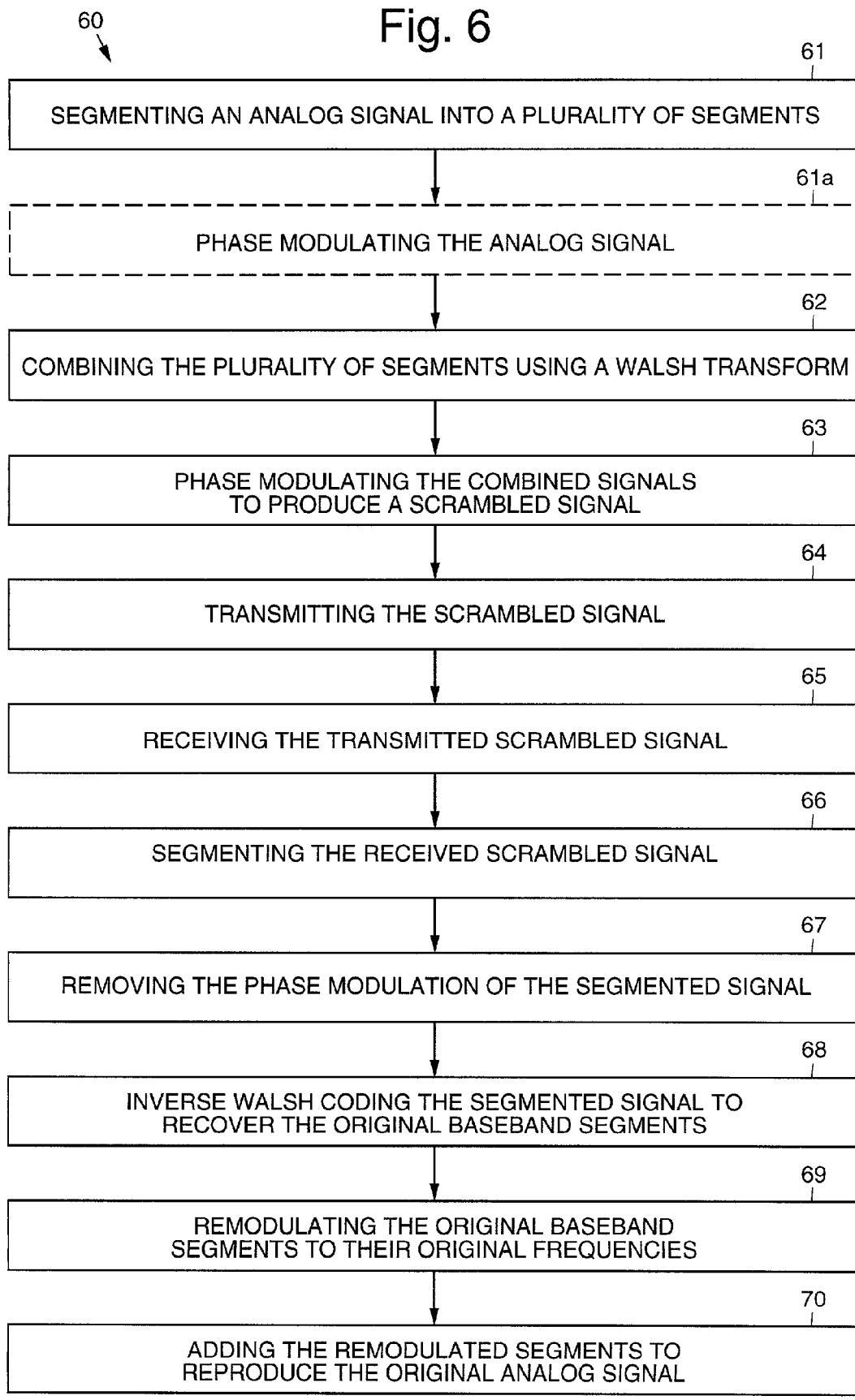

ANALOG PRIVACY SCRAMBLER AND SCRAMBLING METHOD

BACKGROUND

The present invention relates generally to scrambling systems and methods, and more particularly, to an analog privacy scrambling system and method that scrambles analog signals such that a casual receiver cannot recover the analog information contained in the signal.

Historically, privacy for signals is established by digitizing the signals, then scrambling bits of the signal with a noise sequence to generate a transmitted signal. The modulation by the noise sequence is removed at the receiver resulting in a digital signal that is a replica of the original digitized signal. If an analog signal is desired, the signal may be passed through an digital-to-analog converter to recover the analog signal.

When the bandwidth to be transmitted is high enough, this process is not possible. Conversion of the signal to digital form is difficult for high bandwidth signals. If the conversion to digital format were possible, the transmission of the digital format requires several times the bandwidth of the original analog signal. Several bits are transmitted for each sample of the input signal, resulting in bit rates for communication that are typically more than 16 times the bandwidth of the signal. For example, transmission of a 1 GHz bandwidth with a 2 giga-sample per second sample rate, each sample with 8 bits per sample, requires a transmission bit rate of 16 giga-bits per second. Scrambling of these high data rates and the transmission bandwidth required, even for sophisticated modulation techniques, are very difficult.

Even when the bandwidth is not high, privacy for analog signals is difficult. If the dynamic range is high, conversion to a digital format can generate many bits of data, as discussed above. If an analog technique is to be used, the dynamic range should be preserved through the privacy processing. The privacy processing cannot introduce noise that reduces the dynamic range of the signal by an unacceptable amount.

Analog scrambling schemes have included inverting the spectrum of the signal at regular time intervals. The random inversion of the signal frequencies obscures the individual signals in the bandwidth. However, the privacy afforded by this technique is limited since the possible inversion of the signal bandwidth is performed at regular intervals. Processing of the signals with a Fourier transform can identify the time of the transition from the upright signal to the inverted signal and back. In addition the transitions generate transients in the signal that interfere with the quality of the signal after it has been reconstructed.

It is therefore an objective of the present invention to provide for analog privacy scrambling systems and methods that improves upon the above-discussed techniques.

SUMMARY OF THE INVENTION

To accomplish the above and other objectives, the present invention provides for systems and methods that scramble analog signals such that a casual receiver cannot recover the analog information contained in the signal. The systems and methods obscure signals with many overlaying interfering signals and phase modulates the signals to prevent casual recovery without knowing a phase modulation signal used at the transmitter. The systems and methods hide signal components in similar bands and provides for phase modulation that cannot be recovered by a casual receiver.

The present invention extends the usual phase modulation of a digital signal to provide privacy for an analog signal. The technique starts by segmenting an analog signal, then combines the segments using a Walsh transform, for example. This process obscures individual signals by burying the signal in a number of other added signals. The phase modulation introduces a random transformation of the segments that cannot be undone by a casual receiver of the signal.

A desired receiver of the signal recovers the segments using segment selection that removes the phase modulation of the received segments. Applying the Walsh transform to the segments recovers the original baseband segments. Remodulating the segments to their original frequencies and adding the segments reproduces the original signal.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which:

FIG. 6 is a flow diagram illustrating an exemplary scrambling method in accordance with the principles of the present invention.

DETAILED DESCRIPTION

Figure 1A:
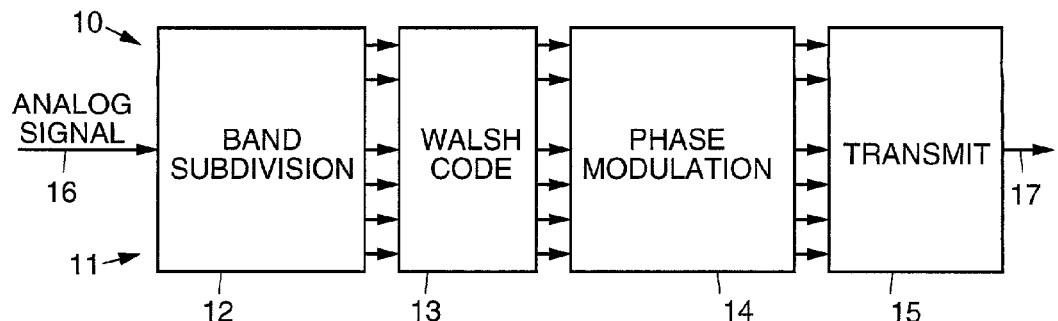
FIG. 1a illustrates a transmitter of an exemplary analog scrambler in accordance with the principles of the present invention.
Figure 1B:
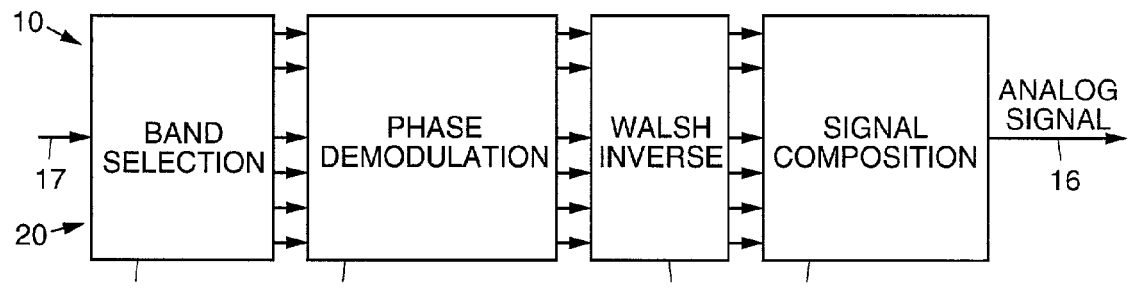
FIG. 1b illustrates a receiver of the exemplary analog scrambler that is employed with the transmitter shown in FIG. 1.

Referring to the drawing figures, FIG. 1 a illustrates a transmitter 11 of an exemplary analog scrambler 10 in accordance with the principles of the present invention, while FIG. 1b illustrates a receiver 20 employed with the transmitter 11 shown in FIG. 1a. The exemplary analog scrambler 10 employs a technique based on the use of Walsh codes and continuous phase modulation.

Referring to FIG. 1a, the transmitter 11 of the exemplary analog scrambler 10 comprises a band subdivision circuit 12 that receives an analog input signal that is to be scrambled. The band subdivision circuit 12 segments the analog signal and applies the segmented signal to a coding circuit 13, such a Walsh coding circuit 13. The Walsh coding circuit 13 combines the segments using a Walsh transform, for example.

The outputs of the Walsh coding circuit 13 are input to a phase modulation circuit 14. The phase modulation circuit 14 introduces a random transformation of the combined segments. The phase modulated combined segments are then applied to a transmit circuit 15 for transmission as a scrambled signal.

Referring to FIG. 1b, the receiver 20 of the exemplary analog scrambler 10 comprises a band selection circuit 21 that receives the transmitted scrambled signal and segments the received scrambled signal. The scrambled signal is applied to a phase demodulation circuit 22 that has phase modulation synchronized with the phase modulation imposed at the transmitter 11 to shift the segmented signal to baseband and remove the phase modulation. The phase demodulated signal is applied to an inverse coding circuit 23, such as an inverse Walsh coding circuit 23. The inverse Walsh coding circuit 23 applies a Walsh transform to the phase demodulated signal to recover the original baseband segments. The original baseband segments are applied to a signal composition circuit 24 that remodulates the segments to their original frequencies and adds the segments to reproduce the original signal.

In operation, the transmitter 11 breaks an input signal up into frequency segments. Preferably the number of segments is a power of two. Eight or sixteen segments are convenient numbers. The individual segments are downconverted to base band forming an in-phase and quadrature signal for each of the band segments. A Walsh function is applied across the baseband signals. The Walsh function applies a multiplication of +1 or −1 for each baseband and adds the basebands together. The number of Walsh codes is a power of two and is equal to the number of basebands that are added together.

Figure 2:
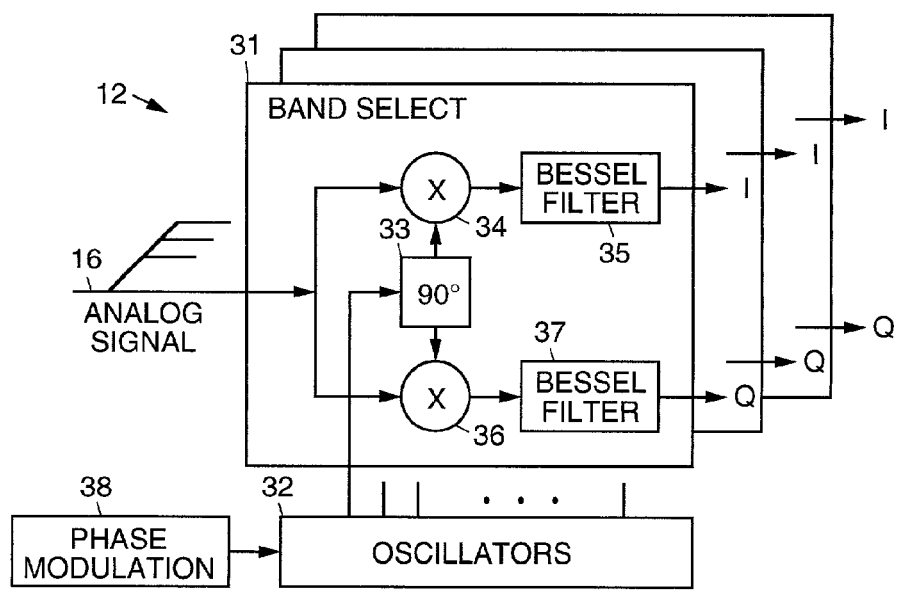
FIG. 2 illustrates a band selection process employed in the present invention.

Details of the band subdivision circuit 12 and its operation to break the input signal into frequency segments is shown in FIG. 2. The band subdivision circuit 12 comprises a plurality of band selection circuits 31 that include I and Q multipliers 34, 36 that each receive the analog input signal at a first input. One of a plurality of oscillators 32 is coupled to a 90 degree hybrid 33 whose respective outputs are coupled to second inputs of the I and Q multipliers 34, 36. Outputs of the I and Q multipliers 34, 36 are coupled to a filter 35, 37, such as a Bessel filter 35, 37. Each individual band selection circuit 31 selects a different part of the input spectrum based on the frequency of the oscillator 32 input to the 90 degree hybrid 33 that is used for band selection.

Phase modulation may additionally be employed in the band subdivision circuit 12 to vary segmentation of the input signal. To achieve this, the input signal is phase modulated before it is input to the I and Q multipliers 34, 36. This may be implemented using phase modulators 38 coupled to the oscillators 32 as shown in FIG. 2.

The operation of the Walsh coding circuit 13 is most easily understood when the number of basebands is two. One Walsh code is [1,1], while the second Walsh code is [1,−1]. The application of the first Walsh code indicates that two baseband signals are to be added together, while the application of the second Walsh code indicates that the two signals are to be subtracted. Transmission of the two Walsh coded signals sends signals that have the contents of the two basebands overlayed on each other. At the receiver 20, the original signals are recovered by adding the two Walsh coded signals to form one of the basebands, and subtracting the second Walsh coded signal from the first to recover the second baseband signal. The two basebands may then be shifted to their original frequencies and added to form the original signal. By extension, when multiple Walsh codes are used, the signal can be broken into as many parts as there are Walsh codes and the Walsh transform used to combine signals for transmission, then decompose signals on reception.

Figure 3:
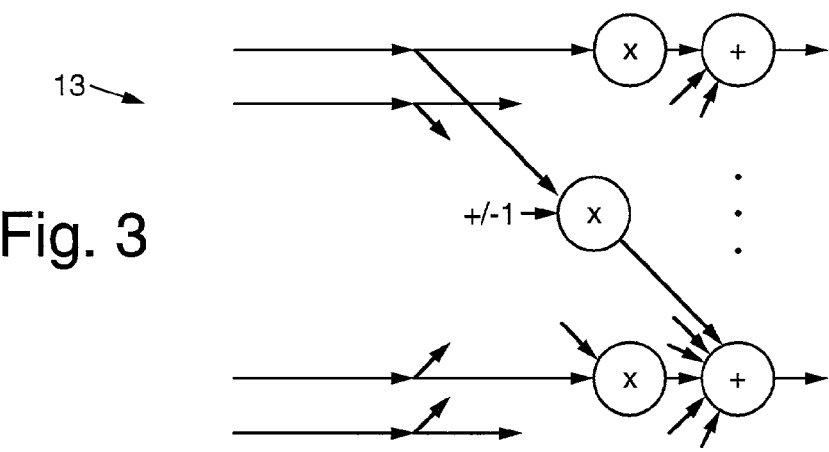
FIG. 3 illustrates Walsh coding of the signal employed in the present invention.

FIG. 3 illustrates Walsh coding of the signal. Walsh coding adds and subtracts signals to form multi-signal components. The inputs are in-phase and quadrature components from the band subdivision (selection) circuit 12, forming a complex signal for input to the Walsh coding.

The Walsh coding adds the individual parts together, producing a large set of interfering signals for any one signal that is transmitted, since the signals are overlayed on any Walsh coded segment. The receiver 20 can apply the Walsh transform across the set of signals and recover the original signals. The present invention uses phase modulation of the Walsh coded segments to achieve privacy.

Each individual Walsh coded segment is phase modulated in the phase modulation circuit 14 with a random signal that can be reproduced at the receiver 20. If this were a digital signal, privacy would be introduced by modulating bits of the communication signal with a random bit stream known to the receiver 20. The random modulation amounts to 180 degree phase modulation of the signal. For these analog signals, the phase modulation is a random phase modulation with a bandwidth that can be controlled.

Figure 4:
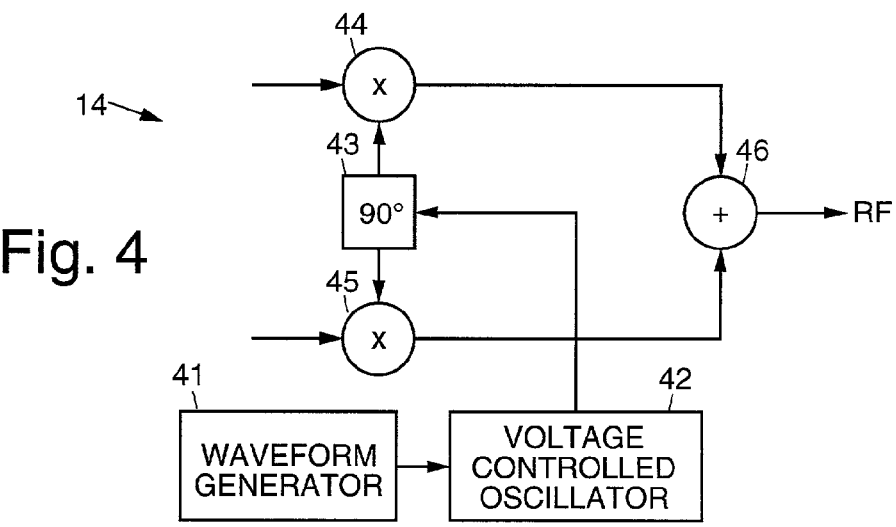
FIG. 4 illustrates phase modulation of the signal employed in the present invention.

An exemplary phase modulation circuit 14 for phase modulating the signal is shown in FIG. 4. As is shown in FIG. 4, the phase modulation of the individual segments randomly modifies the transmitted signals. The exemplary phase modulation circuit 14 comprises a waveform generator 41 that is coupled to a voltage controlled oscillator 42. The output of the voltage controlled oscillator 42 is coupled to a 90 degree hybrid 43. Respective outputs of the 90 degree hybrid 43 are input to first inputs of I and Q multipliers 44, 45. Signals output from the Walsh coding circuit 13 are input to second inputs of the I and Q multipliers 44, 45. Outputs of the I and Q multipliers 44, 45 are summed in an adder 46 to produce an RF signal.

The bandwidth of the phase modulation is one of the parameters of the processing performed by the present invention. If the modulation has a bandwidth that is comparable to the bandwidth of a segment and the modulation index is high, the modulated bandwidth of the segment will be increased to nearly twice the original bandwidth. Less protection is provided when the modulation bandwidth and modulation index are lower.

Comparing the process provided by the present invention with the protection of a digital bit stream, the digital bit stream is usually modulated with a phase modulation that has the same symbol rate as the information. Because of the digital nature of the modulation, the bandwidth of the digital bit stream is not increased, but the basic process is very similar to that discussed above for an analog phase modulation.

The process of phase modulating the signal results in an RF signal that can be transmitted. This RF signal is combined with the other RF signals from other band segments to form the transmitted signal. The transmitter 11 must be substantially linear or be compensated to act as a linear transmitter to prevent intermodulation products between the segments from interfering.

The receiver 20 for the signal is the inverse of the transmitter 11. Band selection circuitry 21 uses the oscillator 32 that has phase modulation synchronized with the phase modulation imposed at the transmitter 11 to shift the signal to baseband and to remove the phase modulation. Only the desired receiver 20 knows the phase modulation signal and can synchronize to the phase modulation. Once the baseband signal for each of the segments has been recovered, the receiver 20 applies the inverse Walsh transform. The form of the inverse Walsh transform is exactly the same as that of the transmitter 11 as shown in FIG. 3, since the Walsh transform is its own inverse.

Figure 5:
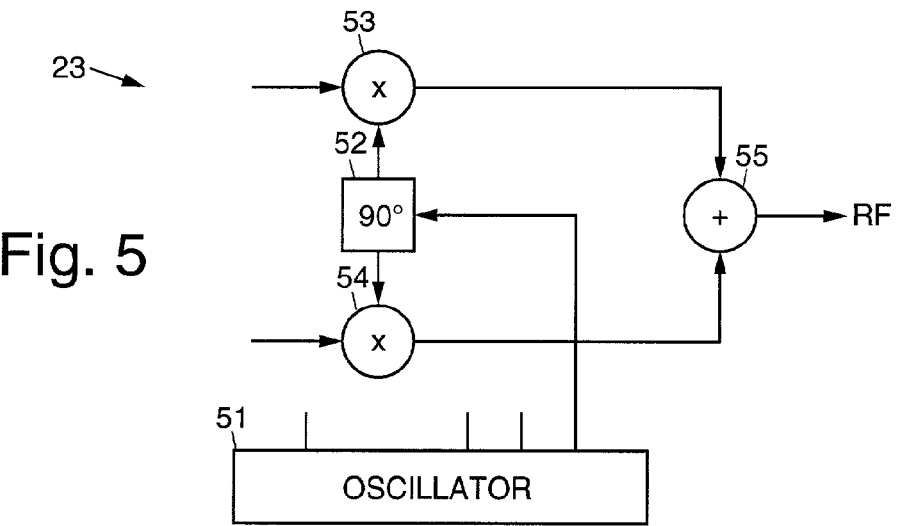
FIG. 5 illustrates that individual band segments are modulated back to their RF positions and combined to form the original signal.

When the individual band segments have been recovered, the signals are modulated back to their original band positions using the signal composition circuit 23 as shown in FIG. 5. As is shown in FIG. 5, individual band segments are modulated back to their RF positions and combined to form the original signal.

An exemplary signal composition circuit 23 comprises a plurality of oscillators 51 that are respectively coupled to inputs of a 90 degree hybrid 52. Respective outputs of the 90 degree hybrid 52 are input to first inputs of I and Q multipliers 53, 54. Signals output from the inverse Walsh coding circuit 22 are input to second inputs of the I and Q multipliers 53, 54. Outputs of the I and Q multipliers 53, 54 are summed in an adder 55 to produce the original RF analog signal.

The process implemented by the present invention requires synchronization between the transmitter 11 and receiver 20. The phase modulation must be synchronized at the receiver 20 with the transmitted phase modulation. Early-late gate processing that is commonly used with digital signals may be used in this application as well. Inserting a low-level carrier in the Walsh coded signal before phase modulation can aid in this process. The phase of the Walsh coded segments must be recovered accurately in order that the inverse Walsh transform can recover the original segments accurately.

The individual bands are phase synchronized such that the signals that are near the cross-over between band segments are added coherently in the combination of segments in the receiver 20. This requires phase and frequency locking the reconstructed segments to each other. This process can be aided by inserting a carrier near to the cross-over frequencies between the segments before the signal is broken into segments. The carrier can be made to be coherent between the segments being combined using phase locked loop techniques in the reconstruction processing.

Referring now to FIG. 6, it is a flow diagram illustrating an exemplary analog signal scrambling method 60 in accordance with the principles of the present invention. The exemplary scrambling method 60 comprises the following steps.

An analog signal is segmented 61 into a plurality of segments. Optionally, the input signal is phase modulated 61a. The plurality of segments are combined 62 or coded 62, such as by using a Walsh transform, for example. The combining or coding process obscures individual signals by burying the signal in a number of other added signals. The combined or coded signals are phase modulated 63 to introduce a random transformation of the segments that cannot be undone by a casual receiver of the signal. The phase modulated signals are then transmitted 64.

The transmitted phase modulated signals are received 65. The received signals are segmented 66 using segment selection. The segmented signals are phase demodulated 67 to remove the phase modulation of the segmented signals. The phase demodulated signals are recovered 68, such as by using inverse Walsh coding, to recover the original baseband segments. The original baseband segments are remodulated 69 to their original frequencies and added 70 to reproduce the original analog signal.

Thus, a technique that extends the usual phase modulation of a digital signal to provide privacy for an analog signal has been disclosed. The technique starts by segmenting an analog signal, then combining the segments using a Walsh transform. This process obscures individual signals by burying the signal in a number of other added signals. The phase modulation introduces a random transformation of the segments that cannot be undone by a casual receiver of the signal.

The desired receiver of the signal will recover the segments with a segment selection that removes the phase modulation of the received segments. Applying the Walsh transform to the segments will recover the original baseband segments. Remodulating the segments to their original frequencies and adding the segments will reproduce the original signal.

Thus analog privacy scrambling systems and methods have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An analog privacy scrambling system comprising:
   a transmitter comprising:
   a band subdivision circuit for receiving an analog input signal that is to be scrambled that frequency segments the analog signal;
   a coding circuit that combines the frequency segments;
   a phase modulation circuit for randomly transforming the combined frequency segments to produce a scrambled phase modulated signal; and
   a transmit circuit for transmitting the scrambled phase modulated signal; and
   a receiver comprising:
   a band selection circuit that receives and segments the transmitted scrambled phase modulated signal;
   phase demodulation circuit that has phase modulation synchronized with the phase modulation imposed at the transmitter to shift the segmented signal to baseband and remove the phase modulation;
   an inverse coding circuit that recovers the original baseband frequency segments from the segmented signal; and
   a signal composition circuit that remodulates the original baseband segments to their original frequencies and adds the segments to reproduce the original signal.

2. The system recited in claim 1 wherein the coding circuit comprises a Walsh coding circuit that combines the segments using a Walsh transform.

3. The system recited in claim 1 wherein the inverse coding circuit comprises an inverse Walsh coding circuit that applies a Walsh transform to the segments to recover the original baseband segments.

4. The system recited in claim 1 wherein the band subdivision circuit comprises a phase modulator for phase modulating the analog signal.

5. An analog privacy scrambling method comprising:
   frequency segmenting an analog signal into a plurality of segments;
   combining the plurality of frequency segments to obscure individual signals by burying the signal in a number of other added signals;
   phase modulating the combined signals to introduce a random transformation of the segments;
   transmitting the phase modulated signals;
   receiving the transmitted phase modulated signals;
   segmenting the received signals using segment selection;
   phase demodulating the segmented signals to remove the phase modulation from the segmented signals;

recovering the original baseband frequency segments from the phase demodulated signals;

remodulating the original baseband segments to their original frequencies; and adding the remodulated segments to reproduce the original analog signal.

6. The method recited in claim 5 wherein the combining step comprises phase modulating the signals using inverse Walsh coding, and the recovering step comprises phase demodulating the signals using inverse Walsh coding.

7. The method recited in claim 5 wherein the segmenting step further comprises phase modulating the analog signal.

8. An analog privacy scrambling method comprising:
frequency segmenting an analog signal;
combining the frequency segments using a Walsh transform;
phase modulating the combined segments to produce a scrambled signal;
transmitting the scrambled signal;
receiving the scrambled signal;
segmenting the received scrambled signal;
removing the phase modulation of the received segments;
inverse Walsh transforming the segments to recover the original baseband frequency segments;
remodulating the segments to their original frequencies; and
adding the remodulated segments to reproduce the original signal.

9. The method recited in claim 8 wherein the segmenting step further comprises phase modulating the analog signal.

10. The method recited in claim 8 wherein phase modulating the combined signals comprises continuous phase modulating the combined signals and wherein inverse Walsh transforming the segments uses inverse continuous phase modulation.

11. The method recited in claim 5 wherein phase modulating the combined signals comprises continuous phase modulating the combined signals and wherein recovering the original baseband frequency segments uses inverse continuous phase modulation.

12. The system recited in claim 1 wherein the phase modulation circuit comprises a continuous phase modulation circuit and wherein inverse coding circuit comprises an inverse continuous phase modulation circuit.

* * * * *